United States Patent Office 2,936,287
Patented May 10, 1960

2,936,287
MAGNETIC PARTICLES

Zenon Kazenas, East Cleveland, Ohio, assignor, by mesne assignments, to John D. Steele, Cleveland, Ohio No Drawing. Application August 1, 1956
Serial No. 605,192

18 Claims. (Cl. 252—62.5)

This invention relates to improvements in materials employed in magnetic flux systems of non-destructive testing and methods of producing such materials. More particularly, this invention relates to improvements in fluorescent magnetic inspection compositions and methods of making such compositions.

Magnetic flux systems of testing are, and have been for the past score of years or so, among the most widely and successfully used non-destructive testing methods for locating flaws in parts and structures of ferromagnetic materials (hereinafter "test pieces"). Such flaws may be voids and discontinuities (with or without surface openings) such as cracks, blow-holes, forging laps, pipes, laminations, deep surface scratches, and the like, or various occlusions of non-magnetic solid material or solid material substantially less paramagnetic than the occluding material of the test piece, such as, for example, slag stringers. In general, such magnetic flux systems comprise the steps of creating a magnetic flux within, or passing a magnetic flux through, the test piece and causing magnetic particles to flow over the surface of it. The magnetic flux diverted by a flaw which may be present in the test piece will cause magnetic particles to adhere to the surface at the flaw or above it (if the flaw is subsurface) and thereby reveal the existence and location of the flaw as well as, frequently, the size and nature of it. These magnetic flux systems of non-destructive testing are not only widely used in manufacturing to prevent the production and use of defective parts and structures, but also to save losses attributable to manufacturing operations on materials having inherent defects or further manufacturing operations on parts in which flaws develop during the course of manufacture. An equally or more important field of use is in maintenance and repair, where the systems are of vital importance in locating minute fatigue cracks, scorings, and the like, which may be the source of ultimate failure and rupture in service. Consequently, the systems are widely used in the aircraft industry and other fields where highly stressed parts and structures are employed; indeed, the great increase in life, efficiency, and safety of equipment in these fields in recent years may be attributable in a large measure to the adoption of such magnetic inspection systems. Because such magnetic inspection systems may avoid large and often critical losses (usually out of all proportion to the relatively slight cost of using the systems), the systems have attracted the attention of highly skilled production and research engineers and extensive efforts have been continuously made over the years to improve the methods and testing materials as to sensitivity, effectiveness, and ease and efficiency of operation.

Substantial and major improvements in magnetic flux systems of non-destructive testing are disclosed in United States Patent No. 2,267,999, granted December 30, 1941, to Robert C. Switzer for "Magnetic Testing." As pointed out in this patent, if the magnetic particles which cling to the test piece are or approach the same color under visible light as the background ("test field") afforded by the piece itself, it is often tedious and difficult to locate the flaw indications. Indeed, under visible light many indications may be missed if the flaws are fine and minute and their indications are correspondingly small. The problem was a serious one since, depending upon the nature and location of the flaw, a very small flaw may be more potentially dangerous than a relatively large one. For example, a very fine and sharp fatigue or grinding crack on the surface of a part in a highly stressed area may be more likely to cause ultimate failure and rupture in service than a relatively gross flaw located in a relatively unstressed portion which, due to the design of the part, may have a factor of safety more than ample to accommodate the flaw in the unstressed portion.

Essentially the improvement disclosed by the aforesaid Switzer patent comprised the employment of fluorescent magnetic particles and inspecting the test piece in the substantial absence of visible light but under invisible fluorescigenous radiation, such as filtered ultraviolet, i.e., "black light." The vastly increased contrast ratio between the visible light-emitting fluorescent magnetic particles adhered to the test piece and the dark background or test field, which neither emitted nor reflected substantial amounts of visible light, greatly expedites the discovery of all flaw indications, including indications so fine or in such difficultly inspected locations (as the internal surface of a long coil spring) that the indications might otherwise pass without detection. Although the above-described improvement greatly increased the sensitivity of magnetic inspection systems and the ease of using them, it created problems of its own which have heretofore defied intensive efforts at solution.

A very serious problem existing in fluorescent magnetic inspection systems has been that of so-called "background scum" which rapidly increased as the flaw-revealing fluorescent magnetic particles were handled in use. These particles, if they were to be effective in indicating minute flaws, themselves had to be very fine and of such small mass, individually, as to be retained on the surface of the test piece by the very slight amount of flux diverted above the surface by the flaw. For this reason, i.e., to obtain small particle size, the preferred magnetic particles have heretofore been magnetic oxide, such as red magnetic iron oxide, which can conveniently be ground to average particle sizes as fine as a micron or less. To render such magnetic particles fluorescent, a preferred commercial procedure, as disclosed in the aforesaid Switzer patent, was to disperse the magnetic particles and fine, highly fluorescent pigments in a lacquer and, upon drying of the lacquer, to grind the mass to particles of the size desired. The desired particle so obtained comprised a magnetic portion, a fluorescent pigment portion, and lacquer adhering the said portions together. However, the grinding of this mass of iron oxide, fluorescent pigment, and lacquer also produced some particles of free oxide, free pigment, lacquered pigment containing no oxide, or lacquer and oxide containing no pigment. Although careful efforts should be and were made to separate the non-magnetic but fluorescent fractions from the grind, as well as the magnetic but non-fluorescent fractions, it was inevitable that some of each remained. Further whether the fluorescent magnetic particles were handled as a dry powder, or more commonly, as a dispersion in an aqueous or oily vehicle, the proportion of these fractions rapidly increased during use due to the breaking of the relatively soft and friable lacquer bond in the attrition of the particles against each other and in the handling equipment. These fluorescent non-magnetic fractions, along with some very slightly magnetic fluorescent particles tend to cling to unflawed surfaces, causing a light-emitting "background scum" which, even in a relatively small amount, greatly decreased the desired contrast ratio between the indications and the test field. Also, due to the configuration of the test piece, the flow of the fluorescent magnetic particles over the test piece sometimes caused the portion constituting "background scum" to collect in streaks, giving false indications as well as confusing true flaw indications. Further, it is suspected that the proportion of non-fluorescent magnetic particles in the mass of testing media may have occasionally masked or displaced fluorescent magnetic particles over a very fine flaw.

Still further, it is important for optimum results that the fluorescent component of the fluorescent magnetic powder exhibit a very high degree of fluorescent efficiency when dispersed in or on very small substrata. Many substances which seem to have extremely high fluorescent brightness when viewed in the mass under black light have been found to be relatively unsatisfactory when joined with magnetic particles. In the first place, the seemingly high brightness of many fluorescent substances en masse may actually be largely due to diffuse reflection in the mass. Secondly, when dispersed on magnetic particles, not only may the fluorescent substances lose the advantage of diffuse reflection, but the magnetic substrata are usually very dark, i.e., absorptive of light, both visible and/or the activating fluorescigenous light. If the fluorescent substance and its binder are relatively translucent, the dark magnetic substratum may absorb a substantial portion of the visible light emitted in response to activating fluorescigenous light as well as some of the fluorescigenous light.

A further hazard confronted in using a fluorescent magnetic substance is that, if used as a dry powder, it is subject to soil which may mask either the activating light or the emitted visible light or both. Accordingly, it is generally advisable to disperse the fluorescent magnetic materials in a liquid medium, both for ease in handling during the test procedures and to minimize soiling of the particles. Unfortunately, when in such liquid vehicles, the dispersions are most conveniently handled by pumps, such as centrifugal pumps, which greatly increase the mechanical attrition on the fluorescent magnetic particles. And despite careful selection of the vehicle for inertness with respect to the fluorescent component, slightly reactive impurities may be picked up and dissolved in the vehicle; due to the large surface (relative to its volume) presented by the fluorescent particles, even a slight degree of reactiveness between the particles and the vehicle (or impurities in it) may greatly diminish or destroy the fluorescence. And it has been discovered that it can be equally disastrous if the fluid vehicle or impurities in it attack the bond of the adhesive holding a fluorescent substance on a magnetic particle.

It is not to be assumed that the foregoing difficulties and problems as anlyzed above were apparent in and of themselves from prior art materials; rather, the foregoing analysis has been appreciated and crystalized in an effort to understand why fluorescent magnetic materials embodying the present invention exhibit greater sensitivity, less background scum, and longer effective fluorescent life, the particular advantages of this invention. Other and further objects and advantages of this invention will be apparent from the following general and detailed specification and the appended claims.

In general, this invention involves a solution of the problem of producing small particles, in the order of less than ten or twelve microns in average size, in which the particles comprise, to a substantial and predominant degree, a paramagnetic sub-particle, a fluorescent sub-particle, and a bonding agent bonding said sub-particles together and so orienting them that the bonding agent is most probably located between said sub-particles. Ideally, the particles comprise a paramagnetic core, the bonding agent as a sheath or skin upon the core, and a relatively opaque fluorescent pigment dispersed in or on the sheath or skin provided by the bonding agent. Fluorescent magnetic particles can be made according to this invention in which a substantial portion of the particles have their components in this ideal condition, although the efficiency and life of particles may not be too seriously affected if they are otherwise oriented.

The achievement of the production of particles so that they consist largely of magnetic sub-particles bonded to fluorescent pigment is not so simple as it may seem. If a three-element mixture of magnetic sub-particles ($a$) bonding agent ($b$) and pigment ($c$) is simply thoroughly mixed together, solidified, and then pulverized, as the lacquer-bonded particles disclosed in the said Switzer patent, not only is the resultant grind going to comprise free elements $a$, $b$, and $c$, but there may be many two-element $a$–$b$ and $b$–$c$ particles, and mathematically as well as actually, there is equal probability for the formation of $a$–$b$–$a$ and $c$–$b$–$c$ particles as the desired $a$–$b$–$c$ particles. Further, in producing particles from such heterogeneous mixtures, the particles are likely to be aggregates which initially exhibit the desired fluorescence and paramagnetism but, upon attrition in use, break down to particles and sub-particles exhibiting only magnetism or only fluorescence.

The solution to the problem faced by the prior art as provided by this invention centers around the use as a bonding agent of a resin which can be made to exist successively in three states or stages: (A) as a liquid; (B) as a solid having a high degree of adhesiveness for the paramagnetic core and the fluorescent pigment but a relatively low degree of internal cohesiveness (i.e., in a relatively frangible state) and (C) as a dense and tough solid having both relatively high internal cohesiveness and adhesiveness for the paramagnetic and pigment particles bonded together in the final particle.

The production of pigments according to this invention and employing as a bonding agent a resin having the above characteristics involves, in general, the following steps: First, when the resin is in its liquid or A stage, the paramagnetic sub-particles are thoroughly dispersed therein and the mixture is then brought to its B stage, at which stage the resin, while adhesive to the paramagnetic sub-particles, is a relatively friable solid. The mass is then broken into small, relatively non-cohesive particles comprising essentially a coat or sheath of resin on the paramagnetic sub-particle and the fluorescent pigment is thereafter milled into the resin-coated particles. The resin is then brought to its tough and horny C stage, usually by heating. The resin usually softens somewhat in the conversion from the B to C stage of cure and, if so, the particles, which may be thus lightly agglomerated together, may be milled to a powder relatively free of such agglomerates and may also be washed or otherwise cleaned of the small amount of resin dust and loose pigment which may be present.

The proportion of the paramagnetic core and bonding agent in the resultant particles are, within broad limits, relatively critical. The proportion of resin in the particles should not exceed 50 to 60 percent, by volume, of the particle; even with the most desirable paramagnetic sub-particles, it has been found that 6 to 10 percent of the resin, by volume, is a critical minimum percentage of resin, with twenty-five to thirty-five providing an optimum. Since the resin sheath also serves as a binder for the pigment imparting fluorescence or visible color to the particle, it should, if the higher percentages of resin are used, be at least translucent to visible light and, in the case of fluorescent magnetic particles, translucent to ultraviolet or other fluorescigenous energy employed. Especially and peculiarly suitable resins, because of their dry, friable intermediate stage and tough, horny final stage, are, as pointed out below, the epoxy resins. Other suitable resins are, for example, the amide-aldehyde resins such as the melamine-formaldehyde resins or the urea-formaldehyde resins, modified or unmodified or blended with each other and/or epoxy resins or fatty or rosin acid esters of epoxy resins. The resin selected should, of course, exhibit inertness and insolubility in the media, usually water or light hydrocarbons, in which the particles may be ultimately dispersed.

The paramagnetic sub-particle or core is preferably selected so that the resultant final particle is less than ten or twelve microns in mean size. The preferred core is carbonyl iron, obtainable commercially in sizes as small as five microns or less and having a spheroidal particle form. Not only does such carbonyl iron have high paramagnetic permeability, but the spheroidal form provides a minimum surface for a given mass of the core to be sheathed with the resin, whereby the individual sheathed particles will have a maximum average magnetic permeability for a particle of a given volume. Mechanically, such spheroidal particles will flow with respect to each other or the surfaces of the test piece and in the particle handling equipment with a minimum of attrition and resistance, except in the areas of the surface of the test piece where the particles are subject to magnetic flux; there the particles, due to their high permeability, exhibit a high degree of resistance to being dislodged from the surface of the test piece or from each other. In lieu of such spheroidal carbonyl iron, other powdered iron, preferably consisting essentially of the alpha allotrope, may be employed. One may also employ other paramagnetic cores, such as magnetic iron oxide, particularly red magnetic iron oxide, and powders of various ferromagnetic alloys.

The pigment carried by the resin in the final particle should be inert to and insoluble in the resin and the media in which the particles may be dispersed. Because of the light-absorptive characteristics of most cores and the relative transparency of most resin binders, the pigment should usually be relatively opaque to visible light and, in the case of fluorescent magnetic particles, absorptive of the activating fluorescigenous energy. The most effective fluorescent agent meeting these requirements has been found to be 2 hydroxy 1, naphthaldazine, although the fluorescent metallic salts of 8-hydroxyquinoline, such as zinc hydroxyquinoline may be employed. When the fluorescent pigment is relatively transparent and its fluorescent efficiency is lessened by the absorption of emitted and/or activating light by the core and/or binder, this efficiency may often be improved by incorporating a diffuse-reflecting opacifying pigment along with the relatively transparent pigment. In fact, when such opacifying pigments are employed, one may also employ fluorescent dyestuffs which would otherwise be unsatisfactory because of the light-absorptiveness of the core and/or binder. To avoid bleed into the media in which the final particles may be dispersed, such dyestuffs should either be insoluble in such media or sufficiently insolubilized by the resin binder to protect the dye from appreciable bleeding.

It is to be understood that non-fluorescent magnetic particles may also be produced according to this invention for inspection under visible light, in which event their colors should be selected to provide striking contrast to the background afforded by the test piece. On such test pieces, a white magnetic particle will usually provide maximum contrast and, for a white, opaque, inert pigment, titanium dioxide is preferably employed. If other non-fluorescent colors are desired, other suitable inert pigments may be used, such as vermilion, molybdate orange, Hansa yellow, Milori green, copper phthalocyanine blue, and carbon black, for example. In a manner similar to the use of fluorescent dyestuffs, non-fluorescent dyestuffs may also be employed, preferably in combination with a suitable opacifying pigment. Titanium dioxide is usually a suitable diffuse-reflecting opacifying agent for dyestuffs, both fluorescent and non-fluorescent.

Depending upon the type and effectiveness of the tracer material selected, its proportion with respect to other components may vary widely, from slight traces, in the case of radioactive material to substantial proportions in the case of non-fluorescent coloring materials.

Illustrative specific examples of magnetic particles made according to this invention are as follows:

Example 1

| | Parts by weight |
|---|---|
| Carbonyl iron (5 micron particle size) | 400 |
| Epoxy resin—175–210 epoxide equivalents (Shell "Epon 828") | 40.8 |
| Metaphenylene diamine (catalyst) | 7.2 |

The catalyst was dissolved in the resin in its liquid A-stage and the carbonyl iron was then thoroughly milled in, providing a thick paste having the consistency of a short dough. The mixture was then allowed to stand (overnight) on a slab until it reached the B-stage of copolymerization. At this stage, the resin is an easily friable solid and the mixture was micro-pulverized or rod-milled to a fine powder, care being taken that the mixture during such pulverization did not exceed room temperature. Upon examination, the resultant fine powder is revealed as spheroidal particles having a thorough coating or skin of the resin. The mixture was then milled in a rod mill with 40 parts (by weight) of 2 hydroxy 1, naphthaldazine for 24 hours, at which time the fluorescent pigment was thoroughly milled on and/or into the resinous sheath on the carbonyl iron core. The powder was then spread on pans in a layer from one-fourth to one-half inch deep and cured for one-half hour at 150° C. During this cure, the resin "kicked over" to its completely copolymerized C-stage, the material in the pans becoming a rather brittle, slightly porous mass and the particles (when bonded together) having bonded together at their points of tangency but not fused to a voidless solid. The several fragments of this cured mixture were then placed in a rod mill and milled for a short time to produce a fine powder averaging about six or seven microns per particle and a small amount of resinous dust and fine pigment which was easily separated by washing. A magnetic testing medium was then prepared by dispersing the cleaned particles in water with a small amount of wetting agent. When flowed over a test piece subjected to a magnetic flux and inspected under black light, particles were retained in unusually sharp, fine, yellow fluorescent lines over fine fatigue cracks but otherwise flowed off unflawed areas. Practically no fluorescent background scum was noticeable. Continued circulation of the medium by a small high-speed centrifugal pump gradually wore the fluorescent sheath from the particles and created some background scum and masking, but at approximately one-tenth the rate at which the best commercially available prior fluorescent magnetic particles deteriorated.

In the foregoing example, the fluorescent pigment, insoluble in the liquid-suspending medium, is, therefore, apparently firmly bonded in the cured polymerized resin sheath which, by volume, constituted between 25% to 35% of the particle.

Example 2

The foregoing example was repeated, except that the carbonyl iron was withheld from the resin and catalyst until it had reached its B-stage and had been powdered. The iron and pigment, both in powder form, were milled into the B-stage resin powder for 24 hours in the rod mill. When examined, the spheroidal sub-particle of iron appeared to be attached to one or more fluorescent sub-particles. The powder was then cured, milled, and cleaned, as in Example 1. When dispersed in an aqueous vehicle and recirculated by a centrifugal pump, the particles deteriorated somewhat more rapidly than the particles produced by Example 1 and the dispersion seemed to have slightly more initial background scum. The only apparent explanation for this difference appears to be that in the course of dispersing the iron and the pigment together into the resin, presumably some of the pigment was coated on the core and the resin became a coating over the pigment. Where the pigment was interposed between the core and the resin sheath, the resin presumably became a mere shell surrounding the core and, having a weaker support, the resin more readily "crocked off" during the attrition provided by the circulating pump.

*Example 3*

The procedure of Examples 1 and 2 was repeated, except that both the iron and the pigment were mixed in the liquid resin in the A-stage. When examined after the resin had been cured to the B-stage and the mixture pulverized, the cores appeared to be less evenly coated. At this semi-cured stage, however, the mixture did constitute a meal-like mass of separate particles which retained to a substantial degree their individual and discrete character when the pulverized mass was taken through the final cure to produce an easily crumbled porous mass. As in Examples 1 and 2, milling after final cure broke up any slight agglomeration of particles which occurred during the final cure. When the finally cured particles were subjected to use after dispersion in an aqueous vehicle, the particles, while still much more stable than the most stable fluorescent magnetic powders previously obtainable, appeared to deteriorate slightly more quickly than the particles produced in Example 2, as well as to exhibit slightly more background scum. This result appeared to be due to a possibly less even sheathing of the cores by the resin as well as to a weaker bond between the resin and core due to probable interposition of sub-particles of pigment at some points on the surface of the core.

*Example 4*

An epoxy resin liquid of lesser viscosity and lesser epoxide equivalent (140–165, Shell "Epon 562") and a different catalyst, diethylenetriamine, were substituted for the resin and catalyst of Example 1, which was then repeated to the point of dispersing the carbonyl iron into the resin-catalyst solution. This resin appears to have no definite B-stage but cures upon standing at room temperatures to its final C-stage as a tough, horny mass. However, by refrigerating the resin-iron mixture with Dry Ice, the resin at its A-stage was readily solidified and the mixture was micro-pulverized into a fine powder. Fluorescent pigment was added and the mixture was milled in a ball mill for six hours, Dry Ice being inserted from time to time to keep the resin from melting and then being cured while the pigment was milled into the resinous sheath. The powder was allowed to stand overnight at room temperature and cure was completed by raising the temperature to 100° C. for a half-hour. The porous mass was then chilled in liquid nitrogen and ground to a fine powder in a rod mill, liquid nitrogen being added from time to time during the grind. The resultant fluorescent magnetic particles, presumably due to the more leathery and resilient nature of the resin, showed good resistance to attrition, but not sufficient resistance to warrant, in most instances, the increased cost of refrigerating the resin to effect grinding.

*Example 5*

Example 1 was repeated except that an epoxy resin of greater epoxide equivalent (300–375, Shell "Epon 964") was employed. At the A-stage this resin is a highly viscous liquid; it was heated to 60° C. to decrease its viscosity and thereby facilitate the solution of the catalyst and dispersion of the iron in it. Further, in the pulverization at the B-stage, the carbonyl iron-resin mixture was milled overnight into a fairly fine powder before the fluorescent pigment was added and milled for an additional 24 hours. The resultant particles, when cured, milled, and cleaned, resisted attrition about as well as the particles of Example 1, again demonstrating the preferability of surrounding the core with a sheath of resin to secure a core-resin-pigment orientation.

*Example 6*

Example 1 was repeated, except that, instead of the fluorescent pigments employed in that example, 15 parts (by weight) of titanium dioxide pigment were added after the resin had been semi-cured to the B-stage and the resin-iron mixture had been pulverized. This non-fluorescent pigment was then milled on and/or into the resin-coated particles in the same manner as the fluorescent pigment was milled in Example 1; the particles then were cured and pulverized as in that example. The resultant particles, due to the excellent covering property of titanium dioxide, were much lighter in comparison to the dark gray or yellowish brown color (in visible light) of many magnetic testing powders. When dispersed in an aqueous vehicle and flushed over test pieces which had acquired a black oxide surface color, the relatively white particles collected by magnetic flux over a flaw were in fairly distinct visible contrast, under ordinary daylight illumination, with the black surface of the test pieces. The very fine indications easily seen under black light when employing fluorescent particles were not so readily discernible, but these non-fluorescent colored particles visually contrasting with the color of the test pieces may be quite adequate where the pieces are to be inspected for relatively gross flaws only.

*Example 7*

The procedure of Example 6 was repeated, except that at the time of adding the titanium dioxide pigment, two parts (by weight) of rhodamine E extra dissolved in 20 parts of aqueous acetone were also added. The acetone served as a volatile solvent carrier for the dyestuff to aid in its distribution in the mass and its dispersion in the resin. Most of the volatile solvent carrier for the dyestuff appeared to evaporate during the subsequent milling and all traces dissappeared during the final cure. In this particular example, the titanium dioxide functions not so much as a coloring pigment in and of itself, but as a diffuse reflector and opacifier for the rhodamine dyestuff, which otherwise would be over-powered by the dark-colored core and would be scarcely discernible in visible light from magnetic particles without any tracer material secured thereto.

The rhodamine dyestuff employed in this example imparts, in conjunction with the opacifier, a visible slightly bluish red color to the finally cured particle when viewed under ordinary visible light. Under black light, the dyestuff fluoresces red. When inspecting iron castings, sand blasted preparatory to machining, for relatively gross defects (such as sub-surface blow-holes, shrinkage, cracks, etc.) that would render the parts unacceptable for further manufacturing operations, the red particles provide a satisfactory contrast with the dull silvery color of the castings to permit inspection under visible light. When different kinds of test pieces are to be inspected for finer defects, the particles made according to this example will show up as glowing red indications under black light. If one desired to employ a dye imparting only a visible non-fluorescent color to the particles or a dye imparting only a fluorescent color, the same procedure described above may be employed.

In the foregoing illustrative examples, epoxy resins are employed because, of the various resins tested, they exhibited the greatest toughness in the finally cured resin while being easily friable and adherent to the core and tracer at a stage of partial cure or set-up. The same techniques for building up at least a partial sheath of resin on the core and adhering or dispersing a tracer in the resin and pulverizing the mixture to iron-resin-tracer particles while the resin is in a more friable state than in the final cure or set-up of the resin and then bringing the resin to final cure without substantial coalescence of the particles to a relatively voidless mass may well be employed in other suitable resins which are now or may become available to the art. Likewise, without departing from the scope of this invention as set forth in the following claims, one may employ cores and tracers other than those named in the specific examples above.

As an example of a satisfactory particle employing a core other than the carbonyl iron given in the preceding examples, paramagnetic particles can be produced as follows:

Example 8

| | Parts by weight |
|---|---|
| Red magnetic iron oxide | 20 |
| Epoxy resin—175–210 epoxide equivalents (Shell "Epon 828") | 6.56 |
| Metaphenylene diamine (catalyst) | .99 |
| 2 hydroxy 1, naphthaldazine | 9 |

The procedure employed is the same as that of Example 1.

The paramagnetic core material, red magnetic iron oxide, was obtained in the form of a fine powder averaging less than six microns; before the proportion shown above was weighed, it was first screened and subjected to magnetic separation in order to eliminate coarse cores and non-magnetic impurities which might have been present. The particles were then produced according to the procedure set forth in Example 1, except, of course, that the red magnetic iron oxide was substituted for the carbonyl iron employed in that example. That is, the oxide, resin in its A-stage, and catalyst were mixed and the mixture cured to the B-stage of the resin. Upon reduction of the mixture to particles of resin-coated oxide, the fluorescent pigment was added, and ground onto the particles, whereupon the mass was cured to the final C-stage of the resin. To eliminate agglomerates, the cured particles were subjected to a final mild grind and cleaned to eliminate non-magnetic dust. The product was reddish in color under ordinary visible light but brightly fluorescent under black light (filtered ultraviolet). The product appeared to perform about as well and in the same fashion as the product of Example 1.

Although the particles may have in visible light an inherent strong color attributable to the paramagnetic core and/or resins therein and some resins may have an inherent and natural fluorescence, the term "color agent" as employed in the following claim is to be understood to mean materials such as, for example, pigments and dyestuffs (with or without associated reflecting and opacifying agents) which are carried with the paramagnetic core and resin and impart thereto a visual appearance enhancing the distinguishability—under incident visible light— of the particles on the test piece when the particles may be distributed on the test piece in a layer as thin as two or three particles thick and in a line as narrow as two or three particles wide. The term "fluorescent agent" as employed in the following claims is to be understood to mean materials such as, for example, fluorescent pigments and dyestuffs (with or without associated reflecting and opacifying agents) which impart to the particle the property of emitting visible light under invisible fluorescigenous energy or enhance that property if the resin or core possessses an inherent and natural fluorescence. Because some materials may be both a "color agent" and a "fluorescent agent," the terms are not to be construed as exclusive; e.g., recitation of a material as a "color agent" is not to be construed as excluding a material which exhibits both fluorescence and visible color; nor is recitation of a "fluorescent agent" to be construed as excluding a material which exhibits fluorescence and color. The term "tracer" is to be understood to include materials which fall within the scope of "color agent" and/or "fluorescent agent" as well as materials which enable the particles to be detected on a test piece by emission or absorption of energy or matter other than light energy perceptible to the human eye, such as, for example, infra red and ultraviolet absorptive materials, radio-active materials, and the like materials whose presence can be detected by various electric, photo-electric or photographic devices. Neither the paramagnetic cores nor the resin binders in the particles are to be construed as "tracers," "color agents" or "fluorescent agents."

What is claimed is:

1. A method of making magnetic particles comprising the steps of dispersing powdered magnetic particles in liquid substantially solvent-free resin curable without substantial evolution of gases and vapors, dispersing a tracer in said dispersion of resins and magnetic particles after said particles have been substantially wetted by said resin, and at least partially pulverizing said magnetic particle-resin-tracer dispersion before completion of cure, whereby in the completed particles the inter-face between the paramagnetic component and the remaining component is predominantly a magnetic-particle-resin inter-face.

2. The method of making paramagnetic powder for use in magnetic flux methods of non-destructive testing, comprising preparing a multi-stage curable resin in a fluid state that is curable to a dense, tough, solid state of final cure without substantial evolution of gases and vapors, bringing the resin to a friable state in an intermediate stage of cure short of said tsate of final cure, pulverizing the resin to a fine powder while in said friable state, completing the cure of the resin particles to a final state of cure while maintaining said resin particles as a porous mass, breaking up the substantial majority of any aggregations of said particles which may have formed during completion of the cure of the pulverized resin, and, at any stage in the method prior to the step of completing the cure of the resin, dispersing finely divided paramagnetic particles and a tracer material as separate, discrete components in the resin.

3. As a composition, a magnetic powder for use in magnetic flux methods of non-destructive testing produced according to the process of claim 2.

4. The method of making paramagnetic powder for use in magnetic flux methods of non-destructive testing, comprising preparing a multi-stage curable resin in a liquid state that is curable to a dense, tough, solid state of final cure without substantial evolution of gases and vapors, bringing the resin to a friable state in an intermediate stage of cure short of said state of final cure, pulverizing the resin to a fine powder while in said friable state, completing the cure of the resin particles to a final state of cure while maintaining said resin particles as a porous mass, breaking up the substantial majority of any aggregations of said particles which may have formed during completion of the cure of the pulverized resin, and, at any stage in the method prior to the step of completing the cure of the resin, separately working into the resin finely divided solid paramagnetic particles and finely divided solid tracer particles.

5. The method of claim 4 in which said paramagnetic particles are worked into the resin before the tracer particles are worked into the resin.

6. The method of making paramagnetic powder for use in magnetic flux methods of non-destructive testing, comprising preparing a multi-stage curable resin in a liquid state that is curable to a dense, tough, solid state of final cure without substantial evolution of gases and vapors, working into the liquid resin finely divided solid paramagnetic particles and finely divided solid tracer particles, one of said types of particles being worked into the resin until substantially completely coated with the resin before working the other of said types of particles into the resin, then bringing said resin to a friable solid state of partial cure, pulverizing the resin to a fine powder, completing the cure of the resin particles to said state of final cure while maintaining said resin particles as a porous mass, and breaking up the substantial majority of any aggregations of said particles which may have formed during completion of the cure of the pulverized resin.

7. The method of making paramagnetic powder for use in magnetic flux methods of non-destructive testing, comprising preparing a multi-stage curable resin in a liquid state that is curable to a dense, tough, solid state of final cure without substantial evolution of gases and vapors, bringing the resin to a friable state in an intermediate stage of cure short of said state of final cure, pulverizing the resin to a fine powder while in said friable state, and then completing the cure of the resin particles to a final state of cure as a porous mass, and breaking up the substantial majority of any aggregations of said particles which may have formed during completion of the cure of the pulverized resin, and, at any stage in the method prior to the step of completing the cure of the resin, separately working into the resin finely divided solid paramagnetic particles and finely divided solid tracer particles, one of said types of particles being worked into the resin until substantially completely wetted and coated thereby before adding and incorporating the other of said types of particles.

8. The method of making paramagnetic powder for use in magnetic flux methods of non-destructive testing, comprising preparing a multi-stage curable resin in a liquid state that is curable to a dense, tough, solid state of final cure without substantial evolution of gases and vapors, bringing the resin to a friable state in an intermediate stage of cure short of said state of final cure, pulverizing the resin to a fine powder while in said friable state, and then completing the cure of the resin particles to a final state of cure as a porous mass and breaking up the substantial majority of any aggregations of said particles which may have formed during completion of the cure of the pulverized resin, and, at any stage in the method prior to the step of completing the cure of the resin, working finely divided solid paramagnetic particles into the resin until said particles are substantially completely wetted and coated thereby and thereafter working into the resin finely divided solid tracer particles.

9. The method of making paramagnetic powder for use in magnetic flux methods of non-destructive testing, comprising preparing a multi-stage curable resin in a liquid state that is curable to a dense, tough, solid state of final cure without substantial evolution of gases and vapors, working into the liquid resin finely divided solid paramagnetic particles until they are substantially completely coated with the resin, bringing the resin to a friable solid state of partial cure, pulverizing the resin containing the paramagnetic particles to a fine powder, milling a mixture of said powder with finely divided solid tracer particles to secure the tracer particles to the particles of resin powder, completing the cure of the resin particles to said final state of cure as a porous mass, to convert the resin to a tough, hornlike condition with the resin powder particles securing paramagnetic particles and tracer particles together, and finally breaking up the substantial majority of any aggregations of said powder particles which may have formed during combination of the cure of the resin.

10. The method of making paramagnetic particles for use in magnetic flux methods of testing comprising the steps of mixing powdered magnetic material in a multi-stage curable resin while said resin is in a liquid state in order to coat said resin on said material, curing the resin in said mixture to a state of partial cure in which said resin adheres to said paramagnetic material but exhibits lower internal cohesiveness than at its stage of final cure, breaking said mixture up into a mass of particles in which an average particle comprises a core of paramagnetic material and partially cured resin adhered thereto, introducing a tracer material into said mass and causing a substantial part of said tracer material to be carried by the partially cured resin, bringing the resin to its state of final cure, and at least partially breaking up any aggregation of said particles which may have formed during the step of bringing said resin to its stage of final cure, whereby the average particle formed comprises a paramagnetic core and tracer material secured to said core by said resin in its final stage of cure, the proportion of resin in the mass of particles formed being less than sixty percent and more than six percent, by volume, of the volume of resin, paramagnetic material, and tracer.

11. The method of claim 10 in which the step of bringing the resin to its state of final cure is performed while the particles formed prior to final cure are substantially en masse and, during such final cure, the identity of the particles en masse is maintained sufficiently so that, if an aggregation of particles is formed during cure due to coalescence of the particles at their areas of tangency, subsequent application of forces just sufficient to break apart coalesced particles in such an aggregation will cause the average coalesced particles to fracture within their coalesced resin sheaths in preference to breaking the paramagnetic cores away from said sheaths.

12. The method of claim 10 in which the resin is an epoxy resin.

13. The method of claim 12 in which the paramagnetic material is spheroidal carbonyl iron.

14. The method of claim 13 in which the tracer is a fluorescent agent comprising 2 hydroxy 1, naphthaldazine.

15. As a composition, a magnetic powder for use in magnetic flux methods of non-destructive testing produced according to the process of claim 14.

16. The method of claim 12, in which the paramagnetic material is magnetic iron oxide.

17. The method of claim 16, in which the tracer is a fluorescent agent comprising 2 hydroxy 1, naphthaldazine.

18. As a composition, a magnetic powder for use in magnetic flux methods of non-destructive testing produced according to the process of claim 17.

References Cited in the file of this patent

UNITED STATES PATENTS

| | | |
|---|---|---|
| 2,267,999 | Switzer | Dec. 30, 1941 |
| 2,277,431 | Fitch | Mar. 24, 1942 |
| 2,365,253 | De Forest et al. | Dec. 19, 1944 |
| 2,465,284 | Schmidt et al. | Mar. 22, 1949 |
| 2,563,520 | Faus | Aug. 7, 1951 |
| 2,618,551 | Walkup | Nov. 8, 1952 |
| 2,694,694 | Greenlee | Nov. 16, 1954 |
| 2,699,413 | Seagren et al. | Jan. 11, 1955 |
| 2,744,040 | Altmann | May 1, 1956 |
| 2,874,063 | Greig | Feb. 17, 1959 |

OTHER REFERENCES

Organic Finishing, June 1948 (pp. 33–40).